United States Patent
Matsuoka

(10) Patent No.: US 9,609,174 B2
(45) Date of Patent: Mar. 28, 2017

(54) DETERMINING A SPECIAL-TONER SCREEN BASED ON A TYPE OF GRADATION PROCESS FOR A COLOR-TONER SCREEN

(71) Applicant: Taira Matsuoka, Kanagawa (JP)

(72) Inventor: Taira Matsuoka, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 14/956,039

(22) Filed: Dec. 1, 2015

(65) Prior Publication Data

US 2016/0165094 A1    Jun. 9, 2016

(30) Foreign Application Priority Data

Dec. 4, 2014  (JP) ................................ 2014-246247

(51) Int. Cl.

| H04N 1/52 | (2006.01) |
|---|---|
| H04N 1/58 | (2006.01) |
| H04N 1/60 | (2006.01) |
| G06K 15/02 | (2006.01) |
| G03G 15/01 | (2006.01) |
| H04N 1/64 | (2006.01) |

(52) U.S. Cl.
CPC .......... H04N 1/52 (2013.01); G06K 15/1878 (2013.01); G06K 15/1881 (2013.01); H04N 1/58 (2013.01); H04N 1/6027 (2013.01); H04N 1/6072 (2013.01); G03G 15/0115 (2013.01); H04N 1/642 (2013.01)

(58) Field of Classification Search
None
See application file for complete search history.

(56) References Cited

U.S. PATENT DOCUMENTS

| 8,743,417 B2 * | 6/2014 | Tanaka ............... G06K 15/1853 358/1.2 |
|---|---|---|
| 9,019,560 B2 * | 4/2015 | Yasukawa .......... G03G 15/0189 358/1.9 |
| 9,083,920 B2 * | 7/2015 | Awamura ................ H04N 1/54 |
| 2012/0063802 A1 | 3/2012 | Suzuki et al. |
| 2015/0242733 A1 * | 8/2015 | Kobayashi ......... G06K 15/1878 358/3.2 |
| 2015/0346622 A1 * | 12/2015 | Itoh ........................ G03G 15/01 399/39 |

FOREIGN PATENT DOCUMENTS

| JP | 4701988 | 3/2011 |
|---|---|---|
| JP | 2012-083736 | 4/2012 |
| JP | 2012186770 A * | 9/2012 |
| JP | 5217548 | 3/2013 |

* cited by examiner

Primary Examiner — Scott A Rogers
(74) Attorney, Agent, or Firm — Duft Bornsen & Fettig LLP

(57) ABSTRACT

An image processing device includes: a first gradation-process determining unit that determines a type of gradation process for a process-color toner plate in accordance with halftone mode information; a second gradation-process determining unit that determines a type of gradation process for a special toner plate other than a process color in accordance with the type of gradation process determined by the first gradation-process determining unit; and a halftone processing unit that performs halftone processes in accordance with the types of gradation processes that are determined by the first gradation-process determining unit and the second gradation-process determining unit.

13 Claims, 14 Drawing Sheets

FIG.4

| HALFTONE MODE | GRADATION PROCESS TYPE |
|---|---|
| HALFTONE MODE 1 | 200 lpi-Dot |
| HALFTONE MODE 2 | 175 lpi-Dot |
| HALFTONE MODE 3 | 150 lpi-Dot |
| HALFTONE MODE 4 | 360 lpi-Line |
| HALFTONE MODE 5 | ERROR DIFFUSION |

FIG.5

| GRADATION PROCESS TYPE | K (BLACK) | | C (CYAN) | | M (MAGENTA) | | Y (YELLOW) | |
|---|---|---|---|---|---|---|---|---|
| | NUMBER OF LINES | ANGLE | NUMBER OF LINES | ANGLE | NUMBER OF LINES | ANGLE | NUMBER OF LINES | ANGLE |
| 200 lpi-Dot | 212 | 45 | 190 | 18 | 190 | 72 | 200 | 90 |
| 175 lpi-Dot | 179 | 46 | 168 | 63 | 168 | 27 | 171 | 90 |
| 150 lpi-Dot | 154 | 45 | 145 | -75 | 145 | 75 | 150 | 90 |
| 360 lpi-Line | 358 | 63 | 358 | 27 | 358 | -27 | 358 | -63 |
| ERROR DIFFUSION | - | - | - | - | - | - | - | - |

FIG.6

| GRADATION PROCESS TYPE | S PLATE | |
|---|---|---|
| | NUMBER OF LINES | ANGLE |
| 200 lpi-Dot | 200 | 90 |
| 175 lpi-Dot | 165 | 74 |
| 150 lpi-Dot | 150 | 90 |
| 400 lpi-Line | 400 | 90 |
| ERROR DIFFUSION | - | - |

FIG.7

| GRADATION PROCESS TYPE FOR PROCESS COLOR | GRADATION PROCESS TYPE FOR SPECIAL TONER |
|---|---|
| 200 lpi-Dot | 200 lpi-Dot |
| 175 lpi-Dot | 175 lpi-Dot |
| 150 lpi-Dot | 150 lpi-Dot |
| 360 lpi-Line | 400 lpi-Line |
| ERROR DIFFUSION | ERROR DIFFUSION |

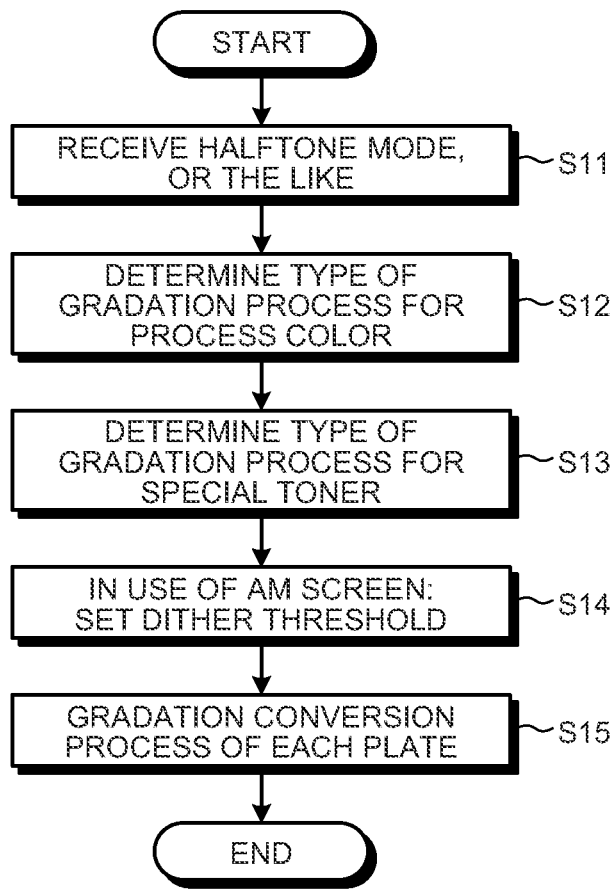

FIG.10

| GRADATION PROCESS TYPE FOR PROCESS COLOR | GRADATION PROCESS TYPE FOR SPECIAL TONER |
|---|---|
| 200 lpi-Dot | ERROR DIFFUSION |
| 175 lpi-Dot | ERROR DIFFUSION |
| 150 lpi-Dot | 150 lpi-Dot |
| 360 lpi-Line | ERROR DIFFUSION |
| ERROR DIFFUSION | ERROR DIFFUSION |

FIG.11

HALFTONE MODE

| HALFTONE MODE 1 |
| HALFTONE MODE 2 |
| HALFTONE MODE 3 |
| HALFTONE MODE 4 |
| HALFTONE MODE 5 |
| HALFTONE MODE 6 |
| HALFTONE MODE 7 |
| HALFTONE MODE 8 |

FIG.12

| HALFTONE MODE | GRADATION PROCESS TYPE |
|---|---|
| HALFTONE MODE 1 | 200 lpi-Dot |
| HALFTONE MODE 2 | 200 lpi-Line |
| HALFTONE MODE 3 | 175 lpi-Dot |
| HALFTONE MODE 4 | 175 lpi-Line |
| HALFTONE MODE 5 | 150 lpi-Dot |
| HALFTONE MODE 6 | 300 lpi-Line |
| HALFTONE MODE 7 | 360 lpi-Line |
| HALFTONE MODE 8 | FM SCREEN |

FIG.13

| GRADATION PROCESS TYPE | K (BLACK) | | C (CYAN) | | M (MAGENTA) | | Y (YELLOW) | |
|---|---|---|---|---|---|---|---|---|
| | NUMBER OF LINES | ANGLE | NUMBER OF LINES | ANGLE | NUMBER OF LINES | ANGLE | NUMBER OF LINES | ANGLE |
| 200 lpi-Dot | 212 | 45 | 190 | 18 | 190 | 72 | 200 | 90 |
| 200 lpi-Line | 192 | 27 | 192 | 63 | 192 | -63 | 200 | 90 |
| 175 lpi-Dot | 179 | 46 | 168 | 63 | 168 | 27 | 171 | 90 |
| 175 lpi-Line | 168 | 27 | 168 | 63 | 168 | -63 | 171 | 90 |
| 150 lpi-Dot | 154 | 45 | 145 | -75 | 145 | 75 | 150 | 90 |
| 300 lpi-Line | 299 | 46 | 298 | 63 | 298 | 27 | 300 | 90 |
| 360 lpi-Line | 358 | 63 | 358 | 27 | 358 | -27 | 358 | -63 |
| FM SCREEN | - | - | - | - | - | - | - | - |

FIG.14

| GRADATION PROCESS TYPE | S PLATE | |
|---|---|---|
| | NUMBER OF LINES | ANGLE |
| 175 lpi-Dot | 171 | 90 |
| 175 lpi-Line | 165 | 74 |
| 150 lpi-Dot | 146 | 18 |
| 300 lpi-Line | 300 | 90 |
| FM SCREEN | - | - |

FIG.15

| GRADATION PROCESS TYPE FOR PROCESS COLOR | GRADATION PROCESS TYPE FOR SPECIAL TONER |
|---|---|
| 200 lpi-Dot | 175 lpi-Dot |
| 200 lpi-Line | 175 lpi-Line |
| 175 lpi-Dot | 175 lpi-Dot |
| 175 lpi-Line | 175 lpi-Line |
| 150 lpi-Dot | 150 lpi-Dot |
| 300 lpi-Line | 300 lpi-Line |
| 360 lpi-Line | 300 lpi-Line |
| FM SCREEN | FM SCREEN |

FIG.16

| GRADATION PROCESS TYPE FOR PROCESS COLOR | GRADATION PROCESS TYPE FOR SPECIAL TONER |
|---|---|
| 200 lpi-Dot | 175 lpi-Line |
| 200 lpi-Line | 175 lpi-Line |
| 175 lpi-Dot | 175 lpi-Line |
| 175 lpi-Line | 175 lpi-Line |
| 150 lpi-Dot | 150 lpi-Dot |
| 300 lpi-Line | 300 lpi-Line |
| 360 lpi-Line | 300 lpi-Line |
| FM SCREEN | FM SCREEN |

FIG.17

| GRADATION PROCESS TYPE FOR PROCESS COLOR |
|---|
| 200 lpi-Dot |
| 200 lpi-Line |
| 175 lpi-Dot |
| 175 lpi-Line |
| 150 lpi-Dot |
| 300 lpi-Line |
| 360 lpi-Line |
| FM SCREEN |

FIG.18

| GRADATION PROCESS TYPE FOR SPECIAL TONER |
|---|
| 200 lpi-Dot |
| 200 lpi-Line |
| 175 lpi-Dot |
| 175 lpi-Line |
| 150 lpi-Dot |
| 300 lpi-Line |
| 360 lpi-Line |
| FM SCREEN |

FIG.19

| HALFTONE MODE |
|---|
| HALFTONE MODE 1 |
| HALFTONE MODE 2 |
| HALFTONE MODE 3 |
| HALFTONE MODE 4 |
| HALFTONE MODE 5 |
| HALFTONE MODE 6 |
| HALFTONE MODE 7 |
| HALFTONE MODE 8 |
| HALFTONE MODE 9 |
| HALFTONE MODE 10 |

FIG.20

| HALFTONE MODE | GRADATION PROCESS TYPE FOR PROCESS COLOR | | | GRADATION PROCESS TYPE FOR SPECIAL TONER |
|---|---|---|---|---|
| | IMAGE | GRAPHICS | TEXT | ALL OBJECTS |
| HALFTONE MODE 1 | 200 lpi-Dot | 200 lpi-Dot | 200 lpi-Dot | 200 lpi-Dot |
| HALFTONE MODE 2 | 200 lpi-Dot | 200 lpi-Dot | 360 lpi-Line | 200 lpi-Dot |
| HALFTONE MODE 3 | 200 lpi-Dot | 360 lpi-Line | 360 lpi-Line | 200 lpi-Dot |
| HALFTONE MODE 4 | 200 lpi-Line | 200 lpi-Line | 200 lpi-Line | 200 lpi-Dot |
| HALFTONE MODE 5 | 150 lpi-Dot | 150 lpi-Dot | 150 lpi-Dot | 150 lpi-Dot |
| HALFTONE MODE 6 | 175 lpi-Dot | 175 lpi-Dot | 175 lpi-Dot | 175 lpi-Dot |
| HALFTONE MODE 7 | 175 lpi-Line | 360 lpi-Line | 360 lpi-Line | 175 lpi-Line |
| HALFTONE MODE 8 | 360 lpi-Line | 360 lpi-Line | 360 lpi-Line | 360 lpi-Line |
| HALFTONE MODE 9 | 300 lpi-Line | 300 lpi-Line | 360 lpi-Line | 300 lpi-Line |
| HALFTONE MODE 10 | FM SCREEN | FM SCREEN | FM SCREEN | FM SCREEN |

FIG.21

| HALFTONE MODE | GRADATION PROCESS TYPE FOR PROCESS COLOR | | | GRADATION PROCESS TYPE FOR SPECIAL TONER |
|---|---|---|---|---|
| | IMAGE | GRAPHICS | TEXT | ALL OBJECTS |
| HALFTONE MODE 1 | 200 lpi-Dot | 200 lpi-Dot | 200 lpi-Dot | 175 lpi-Dot |
| HALFTONE MODE 2 | 200 lpi-Dot | 200 lpi-Dot | 360 lpi-Line | 175 lpi-Dot |
| HALFTONE MODE 3 | 200 lpi-Dot | 360 lpi-Line | 360 lpi-Line | 175 lpi-Dot |
| HALFTONE MODE 4 | 200 lpi-Line | 200 lpi-Line | 200 lpi-Line | 175 lpi-Line |
| HALFTONE MODE 5 | 150 lpi-Dot | 150 lpi-Dot | 150 lpi-Dot | 150 lpi-Dot |
| HALFTONE MODE 6 | 175 lpi-Dot | 175 lpi-Dot | 175 lpi-Dot | 175 lpi-Dot |
| HALFTONE MODE 7 | 175 lpi-Line | 360 lpi-Line | 360 lpi-Line | 175 lpi-Line |
| HALFTONE MODE 8 | 360 lpi-Line | 360 lpi-Line | 360 lpi-Line | 300 lpi-Line |
| HALFTONE MODE 9 | 300 lpi-Line | 300 lpi-Line | 360 lpi-Line | 300 lpi-Line |
| HALFTONE MODE 10 | FM SCREEN | FM SCREEN | FM SCREEN | FM SCREEN |

FIG.22

| HALFTONE MODE | GRADATION PROCESS TYPE FOR PROCESS COLOR | | |
|---|---|---|---|
| | IMAGE | GRAPHICS | TEXT |
| USER DEFINITION 1 | 200 lpi-Dot | 200 lpi-Dot | 200 lpi-Line |
| USER DEFINITION 2 | 200 lpi-Line | FM SCREEN | FM SCREEN |
| USER DEFINITION 3 | 175 lpi-Line | 300 lpi-Line | FM SCREEN |

FIG.23

| HALFTONE MODE | REFERENCE SCREEN | GRADATION PROCESS TYPE FOR SPECIAL TONER |
|---|---|---|
| USER DEFINITION 1 | 200 lpi-Dot | 175 lpi-Dot |
| USER DEFINITION 2 | 200 lpi-Line | 175 lpi-Line |
| USER DEFINITION 3 | 175 lpi-Line | 175 lpi-Line |

FIG.24

| HALFTONE MODE | GRADATION PROCESS TYPE FOR PROCESS COLOR | | | GRADATION PROCESS TYPE FOR SPECIAL TONER | | |
|---|---|---|---|---|---|---|
| | IMAGE | GRAPHICS | TEXT | IMAGE | GRAPHICS | TEXT |
| HALFTONE MODE 1 | 200 lpi-Dot | 200 lpi-Dot | 200 lpi-Dot | 175 lpi-Dot | 175 lpi-Dot | 175 lpi-Dot |
| HALFTONE MODE 2 | 200 lpi-Dot | 200 lpi-Dot | 360 lpi-Line | 175 lpi-Dot | 175 lpi-Dot | 300 lpi-Line |
| HALFTONE MODE 3 | 200 lpi-Dot | 360 lpi-Line | 360 lpi-Line | 175 lpi-Line | 300 lpi-Line | 300 lpi-Line |
| HALFTONE MODE 4 | 200 lpi-Line | 200 lpi-Line | 200 lpi-Line | 175 lpi-Dot | 175 lpi-Line | 175 lpi-Line |
| HALFTONE MODE 5 | 150 lpi-Dot | 150 lpi-Dot | 150 lpi-Dot | 150 lpi-Dot | 150 lpi-Dot | 150 lpi-Dot |
| HALFTONE MODE 6 | 175 lpi-Dot | 175 lpi-Dot | 175 lpi-Dot | 175 lpi-Dot | 175 lpi-Dot | 175 lpi-Dot |
| HALFTONE MODE 7 | 175 lpi-Line | 360 lpi-Line | 360 lpi-Line | 175 lpi-Line | 300 lpi-Line | 300 lpi-Line |
| HALFTONE MODE 8 | 360 lpi-Line | 360 lpi-Line | 360 lpi-Line | 300 lpi-Line | 300 lpi-Line | 300 lpi-Line |
| HALFTONE MODE 9 | 300 lpi-Line | 300 lpi-Line | 360 lpi-Line | 300 lpi-Line | 300 lpi-Line | 300 lpi-Line |
| HALFTONE MODE 10 | FM SCREEN | FM SCREEN | FM SCREEN | FM SCREEN | FM SCREEN | FM SCREEN |

DETERMINING A SPECIAL-TONER SCREEN BASED ON A TYPE OF GRADATION PROCESS FOR A COLOR-TONER SCREEN

CROSS-REFERENCE TO RELATED APPLICATIONS

The present application claims priority to and incorporates by reference the entire contents of Japanese Patent Application No. 2014-246247 filed in Japan on Dec. 4, 2014.

BACKGROUND OF THE INVENTION

1. Field of the Invention

The present invention relates to an image processing device, an image forming system, an image processing method, and a computer program product.

2. Description of the Related Art

Conventionally, there are image forming apparatuses that are provided with clear toner that is colorless toner that contains no color materials in addition to the four color toners of cyan (C), magenta (M), yellow (Y), and black (K). The toner image, formed by using the above-described clear toner, is fixed to the recording sheet on which images have been formed by using the CMYK toner and, as a result, the visual effect or the tactual effect (referred to as the surface effect) is applied to the surface of the recording sheet. The applied surface effect differs depending on what kind of toner image is formed and how it is fixed by using the clear toner. Some of the surface effects simply give glossiness to the recording surface, and other surface effects prevent glossiness. Furthermore, there is a need for the surface effect to, not only give the surface effect to the entire surface of a recording sheet but also give the surface effect only to part of it or apply textures or watermarks by using clear toner. Furthermore, there is sometimes demand for the protection of the surface of a recording sheet. Furthermore, there are surface effects that may be applied by controlling the fixing performance to the recording surface or by performing post-processing with a dedicated post-processing device, such as glosser or low-temperature fixing device.

Furthermore, there are image forming apparatuses that are provided with white toner that contains, as the principal component, white pigment and a binder resin component and that does not contain any color material components other than the single white color in addition to the toners that correspond to the process colors that are the four CMYK colors. In recent years, the white toner has been used as a color material that adds various values, such as printing to transparent recording medium, fabric, or colored paper, in addition to faithful color reproduction using the process colors.

There are known devices that use the fifth toner as the color material that adds the above-described various values other than the CMYK process colors, and there is a known screen technology for performing the tone number conversion by using the large number of lines when images are formed by using multivalued tone image data where the clear toner is used as the fifth plate. For example, Japanese Patent No. 4701988 discloses an image processing device that uses dither with the large number of lines for the clear toner rather than the process colors for the purpose of printing a desirable color image with a smooth image surface even if the transparent toner image is misaligned from the color toner image.

For example, according to Japanese Patent No. 4701988, the visual image quality of transparent toner images is not much affected by a certain degree of deviation or unnaturalness that might be present in the output image. According to the descriptions, it is preferable to use a dot-centered type dither method for color toner images and use an error diffusion method or a dither method with the large number of lines for transparent toner images.

Furthermore, Japanese Patent No. 5217548 discloses the technology for preventing uneven glossiness that occurs due to the difference between the glossiness of a transparent toner area and the glossiness of a chromatic color toner area or moire patterns due to the occurrence of periodic toner scattering at the position where the transparent toner and the chromatic color toner are superimposed. According to Japanese Patent No. 5217548, the dither with the large number of lines is used for the clear toner rather than the process colors, transfer is conducted such that the clear toner plate is located on the top and, in the printing mode for reducing uneven glossiness, the percentage of the image area with the maximum density is decreased.

However, the above-described conventional technologies have the following problem. With regard to the image forming devices that are provided with special toner (clear toner, white toner, or special color toner) other than the process colors, consideration is not given to the optimization of a special-toner screen that is superimposed on multiple process-color toner screens. Therefore, in some halftone modes, unexpected moire or uneven glossiness occurs depending on the superimposition condition of the process-color toner screen and the special-toner screen. Specifically, there is a problem in that image outputs may not be obtained in accordance with the intended purpose of the halftone mode.

Furthermore, Japanese Patent No. 4701988 and Japanese Patent No. 5217548 do not consider the optimization of a special-toner screen that is superimposed on multiple process-color toner screens. Therefore, in some halftone modes, unexpected moire or uneven glossiness occurs depending on the superimposition condition of the process-color toner screen and the special-toner screen, and image outputs may not be obtained in accordance with the intended purpose of the halftone mode.

In view of the foregoing, there is a need to obtain image outputs in accordance with the intended purpose of the halftone mode when the special toner plate is superimposed on the process-color toner plate.

SUMMARY OF THE INVENTION

It is an object of the present invention to at least partially solve the problems in the conventional technology.

An image processing device includes: a first gradation-process determining unit that determines a type of gradation process for a process-color toner plate in accordance with halftone mode information; a second gradation-process determining unit that determines a type of gradation process for a special toner plate other than a process color in accordance with the type of gradation process determined by the first gradation-process determining unit; and a halftone processing unit that performs halftone processes in accordance with the types of gradation processes that are determined by the first gradation-process determining unit and the second gradation-process determining unit.

An image processing method includes: first determining a type of gradation process for a process-color toner plate in accordance with halftone mode information; second determining a type of gradation process for a special toner plate other than a process color in accordance with the type of gradation process determined at the first determining; and performing a halftone process in accordance with the types of gradation processes that are determined at the first determining and the second determining.

A computer program product includes a non-transitory computer-readable medium containing an information processing program. The program codes causes a computer to perform: first determining a type of gradation process for a process-color toner plate in accordance with halftone mode information; second determining a type of gradation process for a special toner plate other than a process color in accordance with the type of gradation process determined at the first determining; and performing a halftone process in accordance with the types of gradation processes that are determined at the first determining and the second determining.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is an explanatory diagram that illustrates the selection of a halftone mode and a corresponding type of gradation process according to the first embodiment;

FIG. 5 is an explanatory diagram that illustrates the number of screen lines and the angle of each color, which correspond to the type of gradation process in FIG. 4;

FIG. 6 is an explanatory diagram that illustrates examples of the type of gradation process, the number of screen lines, and the angle, stored in a screen setting unit according to the first embodiment;

FIG. 7 is an explanatory diagram that illustrates an example of the type of the gradation process for the special toner, corresponding to the type of gradation process for the process color according to the first embodiment;

FIG. 8 is a flowchart that illustrates an example of operations during the gradation process according to the first embodiment;

FIG. 9 is an explanatory diagram that illustrates an example of the type of gradation process for the special toner according to a second embodiment;

FIG. 10 is an explanatory diagram that illustrates an example of the type of the gradation process for the special toner, corresponding to the type of gradation process for the process color according to the second embodiment;

FIG. 11 is an explanatory diagram that illustrates an example of the UI according to a third embodiment;

FIG. 12 is an explanatory diagram that illustrates the selection of a halftone mode and a corresponding type of gradation process according to the third embodiment;

FIG. 13 is an explanatory diagram that illustrates the number of screen lines and the angle of each color, which correspond to the type of gradation process in FIG. 12;

FIG. 14 is an explanatory diagram that illustrates examples of the type of gradation process, the number of screen lines, and the angle, stored in the screen setting unit according to the third embodiment;

FIG. 15 is an explanatory diagram that illustrates an example of the type of the gradation process for the special toner, corresponding to the type of gradation process for the process color according to the third embodiment;

FIG. 16 is an explanatory diagram that illustrates an example of the type of gradation process for the special toner, corresponding to the type of gradation process for the process color according to a fourth embodiment;

FIG. 17 is an explanatory diagram that illustrates an example of the type of gradation process for the process color according to a fifth embodiment;

FIG. 18 is an explanatory diagram that illustrates an example of the type of gradation process for the special toner according to the fifth embodiment;

FIG. 19 is an explanatory diagram that illustrates an example of the UI according to the fifth embodiment;

FIG. 20 is an explanatory diagram that illustrates the selection of a halftone mode and a corresponding type of gradation process according to the fifth embodiment;

FIG. 21 is an explanatory diagram that illustrates the selection of a halftone mode and a corresponding type of gradation process according to a sixth embodiment;

FIG. 22 is an explanatory diagram that illustrates the type of gradation process for the process color that corresponds to the halftone mode according to a seventh embodiment;

FIG. 23 is an explanatory diagram that illustrates the result of determination of a reference screen according to the seventh embodiment; and FIG. 24 is an explanatory diagram that illustrates an example of the type of gradation process for the special toner that corresponds to the type of gradation process for the process color in each halftone mode according to a ninth embodiment.

DETAILED DESCRIPTION OF THE PREFERRED EMBODIMENTS

With reference to the attached drawings, a detailed explanation is given below of an embodiment of an image processing device, an image forming system, an image processing method, and a computer program product according to the present invention.

First Embodiment

The example of the image forming system according to the embodiment may be widely applied to image processing devices that function to output images, such as printers, copiers, or facsimile machines. Here, an explanation is given by using a digital front end (DFE: a printer control device) as an example.

Figure 1:
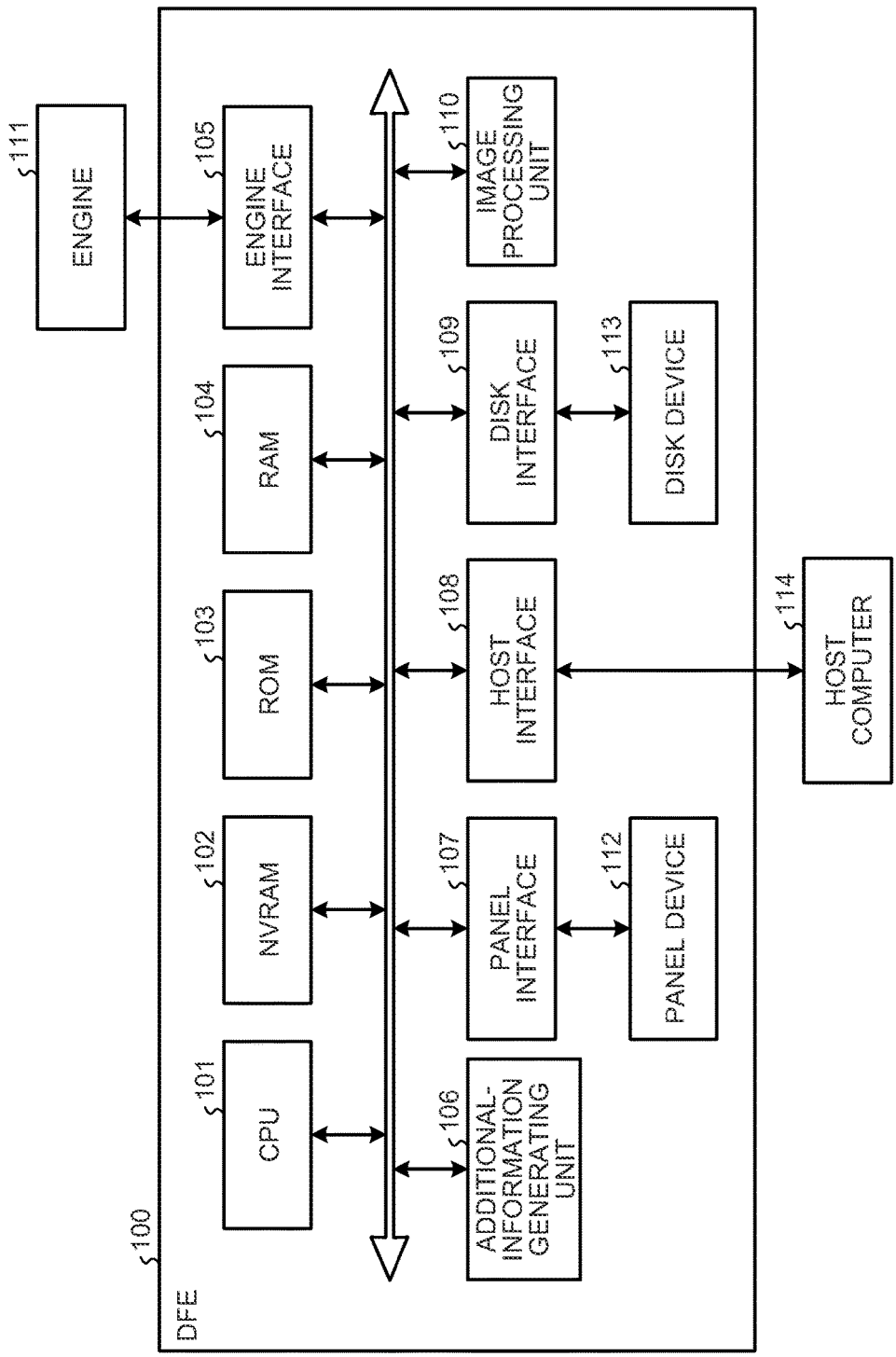
FIG. 1 is a block diagram that illustrates an example of the hardware configuration of a DFE according to the present embodiment.

FIG. 1 is a block diagram that illustrates an example of the hardware configuration of a DFE according to the present embodiment. In a DFE 100, illustrated in FIG. 1, the following hardware is connected via a bus. The DFE 100 includes a CPU 101, an NVRAM 102, a ROM 103, a RAM 104, an engine interface 105, an additional-information generating unit 106, a panel interface 107, a host interface 108, a disk interface 109, an image processing unit 110, or the like.

The engine interface 105 is connected to an engine 111, the panel interface 107 to a panel device 112, the disk interface 109 to a disk device 113, and the host interface 108 to a host computer 114.

The central processing unit (CPU) 101 performs overall control of the DFE 100 in accordance with a control program that is stored in the read-only memory (ROM) 103, mode designation from the panel device 112, and a command from the host computer 114. The NVRAM 102 is a non-volatile random access memory (RAM) that temporarily stores data, such as the details of the mode designation from the panel device 112. The random access memory (RAM) 104 is used as a working memory of the CPU 101, a buffer for input data, a page buffer for print data, a memory for the download font, or the like.

The engine interface 105 is an interface that communicates with the engine 111 for commands, statuses, and print data. The engine 111 is the mechanism for printing images on sheets, or the like, by using the process color materials of cyan (C), magenta (M), yellow (Y), and black (K) and a special toner as the fifth color material. According to the present embodiment, a transparent toner is used, which is the recording material that is almost colorless and transparent.

The panel interface 107 is an interface that communicates with the panel device 112 for commands and statuses. The panel device 112 is an input/output device, such as a touch panel, and it is used to display the state of the printer, or the like, or to input mode designation, or the like, from a user. The mode designation by the user is made via the panel device 112 and is stored in the NVRAM 102. Users may set, via the printer driver, the glossiness designation mode for controlling the glossiness of output images or set the halftone mode, the resolution, the color conversion profile, or the like.

The host interface 108 is an interface that communicates with the host computer 114. The disk interface 109 is an interface that communicates with the disk device 113. The disk device 113 is a disk device (e.g., a hard disk device) that stores font data, programs, print data, or the like.

The image processing unit 110 performs a color conversion process, a halftone process, or the like, and the details are described later.

Next, an explanation is given of an operation of the image forming system that includes the DFE 100 that is configured as in FIG. 1. The input image data that is transmitted from the host computer 114 via the host interface 108 is divided into three types of objects, i.e., texts (characters), graphics (figures), images (pictures), and it has a data format that is interpretable by printers. Each data format of the object data is interpreted, and it is developed into a bitmap image for each object. The color space of image data may be either RGB or CMYK. Furthermore, data on the special toner plate that is created by a user may be treated. Moreover, the special toner plate is hereafter referred to as the special plate (S plate) as appropriate.

The additional-information generating unit 106 adds the information as to which one of the three types of objects each pixel data belongs to. Furthermore, the information from the additional-information generating unit 106 is transmitted to the image processing unit 110 together with the image data such that the user's print settings, which are referred to by the image processing unit 110, such as the halftone-mode setting information, bibliographic information, or the like, are added thereto.

The image processing unit 110 performs a color conversion process on 8-bit bitmap images. The color-conversion processed data is subjected to a total-amount restriction process and a gradation process, and then a CMYK+S 2400-dpi 1-bit halftone-processed image is transmitted to the engine 111 via the engine interface 105 for printing. Here, the S plate is not limited to the data that is created by a user, and it may be generated within the DFE 100. For example, it is performed such that the object information is referred to, and the S plate data of 100% is uniformly generated only for the image object.

Figure 2:
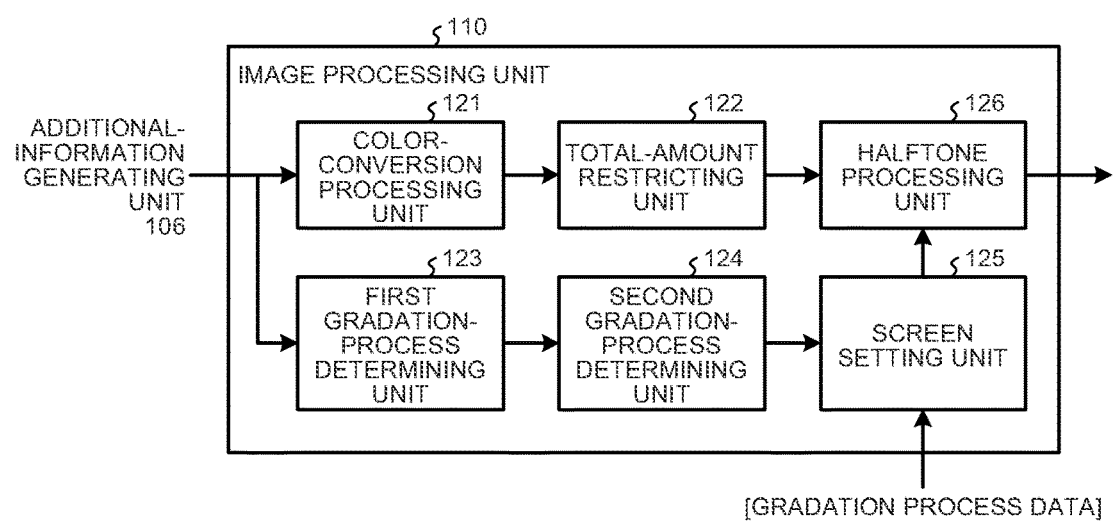
FIG. 2 is a block diagram that illustrates the functional configuration of an image processing unit.

FIG. 2 is a block diagram that illustrates the functional configuration of the image processing unit 110. As illustrated in FIG. 2, the image processing unit 110 has functions of a color-conversion processing unit 121, a total-amount restricting unit 122, a first gradation-process determining unit 123, a second gradation-process determining unit 124, a screen setting unit 125, and a halftone processing unit 126. The image processing unit 110 implements the above functions by using the CPU 101. Here, part or all of the above-described functions of the CPU 101 may be configured by using hardware.

The color-conversion processing unit 121 may perform a profile conversion on the color space of the document image in accordance with the user designation so as to convert it into the image data in the CMYK color space according to the characteristics of the engine 111 or convert it into a gray-scaled image by using brightness information. The color-conversion processing unit 121 does not make any changes to data on the S plate.

The total-amount restricting unit 122 restricts the total amount of toner so that it becomes equal to or less than a predetermined amount, thereby preventing the excessive loads applied during processes or the occurrence of fixing failures.

The first gradation-process determining unit 123 determines the type of gradation process for the process-color toner plate on the basis of the halftone mode information. The second gradation-process determining unit 124 determines the type of gradation process for the special toner plate other than the process colors in accordance with the type of gradation process that is performed by the first gradation-process determining unit 123. The operations of the first gradation-process determining unit 123 and the second gradation-process determining unit 124 are described in detail later.

The halftone processing unit 126 performs a halftone process on the basis of the types of gradation processes that are determined by the first gradation-process determining unit 123 and the second gradation-process determining unit 124. Here, the halftone processing unit 126 performs a tone conversion process on the 8-bit image data, on which the total amount has been restricted, thereby generating small-valued data that can be output by the engine 111 while its gradation is maintained. According to the present embodiment, the first gradation-process determining unit 123 determines the screen that is applied to the CMYK plate and, based on it, the second gradation-process determining unit 124 determines the screen that is applied to the S plate. In accordance with the determination result, the screen setting unit 125 invokes the stored process-color screen and the special-toner screen from the memory (the disk device 113) and sets the dither pattern in the halftone processing unit 126. The halftone processing unit 126 performs a typical dither process or error diffusion process and then terminates the tone conversion process.

Here, an explanation is given of the total-amount restricting unit 122. According to the present embodiment, the input image data to the total-amount restriction module is CMYKS and the output image data is C'M'Y'K'S' in the following description. Each of CMYKS is 8-bit data of 0 to 255.

The total amount of toner, which is allowed for a process is limA. Here, limA is 700. If the S plate is not present in the input image data, K'=K, C'=α×C, M'=α×M, Y'=α×Y. Furthermore, α=(limA−K)/(C+M+Y). In a case where the S plate is present in the input image data, even if the total amount is restricted, a predetermined amount of S plate data is maintained and, therefore, a total-amount restriction process is different depending on whether the S plate data is equal to, greater than, or less than limS.

If the S data is equal to or greater than limS, K'=K, C'=α×C, M'=α×M, Y'=α×Y, S'=limS. Furthermore, α=(limA−K−limS)/(C+M+Y).

If the S data is less than limS, K'=K, C'=α×C, M'=α×M, Y'=α×Y, S'=S. Furthermore, α=(limA−K−S)/(C+M+Y).

Figure 3:
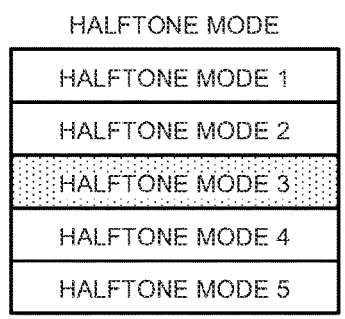
FIG. 3 is an explanatory diagram that illustrates an example of the UI according to a first embodiment.

Next, an explanation is given of the flow of a screen process. First, to designate the type of screen process that is applied to the print material, the user selects the halftone mode via the driver. FIG. 3 illustrates an example of the user interface (UI) of the driver. The user selects one from halftone modes 1 to 5.

The additional-information generating unit 106 adds the halftone mode information, designated by the user, to the image data as the bibliographic information and transmits it to the image processing unit 110. On the basis of the halftone mode information, the first gradation-process determining unit 123 determines the type of gradation process that is performed for the process-color plate. According to the present embodiment, the operation that corresponds to the type of gradation process, which is illustrated in FIG. 4, is performed on all the objects. The disk device 113 stores the table that represents the relationship between the halftone mode and the type of gradation process, which is equivalent to FIG. 4, and the type of gradation process is determined by referring to it.

Here, as 200 lpi-Dot is illustrated, the numerical value represents the number of lines, and it is indicated that the number of lines is about 200 lines. Dot represents the dot-centered type screen, where a dot grows in an exact circle in accordance with the growing of dither (hereafter, referred to as the dot screen). Line represents a dither screen (hereafter, referred to as the line screen), where a dot continuously grows in a line shape in the direction with a certain angle in accordance with the growing of dither. Here, "lpi" is an abbreviation for line per inch.

Here, FIG. 5 illustrates the number of screen lines and the screen angle of the CMYK plates, which correspond to each type of gradation process. For the dot-distributed type screen process, such as error diffusion, the number of screen lines and the screen angle are not defined.

Generally, with AM screens that represent the gradation by using the size of halftone dots, such as 200 lpi-Dot or 150 lpi-Dot, a screen process is higher definition as the number of lines is larger, which makes improvements in discontinuity of thin lines and jaggies. However, with the engine 111 that has an electrophotographic system according to the present embodiment, if the screen with a relatively large number of lines is used, stable dot reproduction is not achieved, and unevenness or roughness is noticeable on documents that primarily contains photo images. Although the boundary value of the number of lines that causes unstable dot reproduction is not definitely defined, there is a tendency that it is difficult to achieve stable dot reproduction during a process with the number of screen lines, e.g., equal to or greater than about 300 lines. Therefore, to improve the thin-line reproducibility or the sharpness, a user uses a screen process with a relatively large number of lines and, to require more stable dot reproduction, he/she selects a screen process with a small number of lines. By using a screen process with stable dot reproduction, it is possible to achieve more uniform image output with regard to a uniform color region and to obtain images that are less likely to change even though the same image is repeatedly output.

Furthermore, when images are output, moire (stripe patterns) due to interference of the screens is sometimes observed. As the color or the density that easily causes moire is different depending on the type of screen, moire is sometimes prevented by selecting a different screen process when it occurs; however, as the AM screen is a periodic screen process, it is sometimes difficult to completely prevent it. Conversely, the interference does not easily occur during a dot-distributed type screen process, such as green noise, blue noise mask, or error diffusion process. Furthermore, with the dot-distributed type screen, a screen process does not have any periods or the angle dependence, and the discontinuity of only thin lines in the direction with a specific angle, as in the case of AM screens, does not occur. Therefore, for the purpose of preventing the interference or improving the reproducibility of thin lines, the user selects an error diffusion process of the halftone mode 5. Furthermore, if it is difficult to use sufficiently small dots, the texture of images is undesirable and they are likely to look rough due to its non-periodicity.

Heretofore, considerations have been given to a clear screen process. However, although there are various types of use applications depending on the halftone mode as described above, considerations are not given to the halftone mode, and only an appropriate screen as a clear-plate screen under a fixed condition is in discussion.

According to the present embodiment, the screen setting unit 125 stores the special-toner screen as illustrated in FIG. 6. In the above Japanese Patent No. 4701988, as for transparent toner images, even if a certain degree of deviation or unnaturalness is present in output images due to the large number of lines, the visual image quality is not likely to be affected much. However, in Japanese Patent No. 4701988, if the number of lines is increased, the glossiness is affected by the unevenness that is caused by instability, and it is recognized as uneven glossiness. Particularly, in the case of an unstable engine, there is a possibility that fixing is unevenly conducted and the visual image quality is adversely affected. Conversely, if the screen with the small number of lines is used, the engine 111 becomes significantly stable; therefore, the occurrence of the above-described uneven glossiness is prevented so that images with even glossiness may be obtained.

For these reasons, it can be said that it is preferable to apply, to the special toner plate, the screen that has almost the same degree of stability as the process-color plate. It is preferable that, in the single engine 111, the screen for the special toner plate is changed depending on the halftone mode and the corresponding type of process-color toner gradation process.

The screen with high stability is set as the process-color screen in the halftone mode for which a user requires high stability. On the basis of the screen process, it is needed to set, to the special toner plate, the screen that has high stability when they are combined. If a slightly unstable screen with the large number of lines is originally used, the screen that has almost the same degree of stability is applied to the special toner plate, whereby it is possible to provide images with a sufficient image quality, which is required by the user.

Furthermore, with regard to images for which the screen with the large number of lines is applied to the process-color plate, if the gradation process with the small number of lines is applied to the clear screen to be superimposed, jaggies are likely to occur relatively in the clear toner plate, and discontinuity of thin lines are likely to happen. There may be a case where, although the process color toner is applied to line drawings, character edges, or the like, the clear toner is not applied in parts. Therefore, in such a case, the screen with the large number of lines is also applied to the clear toner plate.

According to the present embodiment, the screen setting unit 125 stores the screen process, illustrated in FIG. 6, as the special-toner screen. The second gradation-process determining unit 124 determines the type of gradation process for the optimum special toner on the basis of the information on the screen set of the CMYK plates that are determined by the first gradation-process determining unit 123.

The second gradation-process determining unit 124 determines the type of gradation process that is performed on the special toner plate on the basis of the type of gradation process that is performed on the process-color plate. According to the present embodiment, the types of gradation processes are related as in FIG. 7. The disk device 113 stores the table that represents the relationship between the halftone mode and the type of gradation process, which is equivalent to FIG. 7, and the type of gradation process is determined by referring to it.

In the case of this example, the settings are made so as to obtain almost the same number of lines (the one that is closest to the number of lines for the type of process-color toner gradation process among the choices of the number of screen lines for the special-toner gradation process). Furthermore, when the user selects the error diffusion, the halftone mode is set for the purpose of preventing the occurrence of interference; therefore, the screen that basically prevents the occurrence of interference is also selected for the special toner.

Thus, the type of gradation process for the process color and the type of gradation process for the special toner are determined, and the screen setting unit 125 sets, in the halftone processing unit 126, the corresponding dither matrix among the screens that are stored in the DFE 100. The setting of the dither matrix is not made during an error diffusion process, and the halftone processing unit 126 performs an error diffusion process.

Next, FIG. 8 illustrates a flowchart of the sequence of gradation process according to the present embodiment as described above. First, the image processing unit 110 receives, from the additional-information generating unit 106, the image data that includes the halftone mode information that is designated by the user (Step S11). Next, the first gradation-process determining unit 123 determines the type of gradation process for the process color on the basis of the above-described halftone mode information (Step S12). Furthermore, the second gradation-process determining unit 124 determines the type of gradation process for the special toner on the basis of the type of gradation process for the process color that is determined at Step S12 (Step S13). Next, the screen setting unit 125 reads the screen information for the process color and for the special toner, which are determined as described above, and sets the dither threshold when the AM screen is used (Step S14). Finally, the halftone processing unit 126 performs a gradation conversion process of each plate on the basis of the information that is set by the screen setting unit 125 (Step S15).

Furthermore, according to the present embodiment, the types of gradation processes and the dither screen are illustrated as examples; however, this is not a limitation on the scope of the present invention, and it may be widely applied to different dither screen line numbers, screen angles or different types of gradation processes.

As described above, the number of screen lines of the special toner plate for the second gradation-process determining unit 124 is set to the same value as the number of screen lines for the first gradation-process determining unit 123. Thus, the screen that has almost the same degree of stability as the process-color plate is applied to the special toner plate, whereby it is possible to provide images with a sufficient image quality, which is desired by the user.

The summary of the above-described embodiment is as follows. First, the type (dither growing method, the number of lines) of gradation process for the process-color toner screen, which is set in accordance with the halftone mode of the user, is determined. Furthermore, an appropriate type of gradation process is determined from multiple screen processing methods (dither growing method, the number of lines) that are prepared for special toner (clear toner, white toner, special color toner) other than the process colors. Then, images are formed by using the process color and special toner on the basis of the determined type of gradation process. Thus, when the special toner (clear toner, white toner, special color toner) screen is superimposed on multiple screens for the process color toner, image outputs may be obtained in accordance with the intended purpose of the halftone mode.

Thus, the appropriate type of gradation process for the special toner is set in accordance with the type of gradation process for the process color, whereby image outputs may be obtained in accordance with the intended purpose of the screen for the process color toner in the selected halftone mode.

Second Embodiment

In the example that is depicted according to the above-described first embodiment, the number of types of gradation processes for the process color toner and the number of types of gradation processes for the special toner are the same; however, there is no limitation on the application range of the present invention. Here, an explanation is given of the system where the types of gradation processes for the process colors, executable by this system, are the same as those of the first embodiment as illustrated in FIG. 4 and only two types of gradation processes for the special color are executable as illustrated in FIG. 9.

According to the present embodiment, if the number of screen lines for the first gradation-process determining unit 123 is lower than a predetermined value, the second gradation-process determining unit 124 assigns the screen with the small number of lines and, otherwise, assigns the dot-distributed type screen.

In this case, for example, the second gradation-process determining unit 124 assigns the type of gradation process for the special toner, which corresponds to each mode of the gradation process for the process color as in FIG. 10. In the halftone mode 3, which is the mode in which the most stable images need to be output, the stable screen is also assigned to the special toner plate and, in other modes, an error diffusion process is applied to prevent moire from being noticeable.

As described above, in the mode in which the most stable images need to be output, a stable screen process is also performed for the special toner plate and, in other modes, a screen process is performed to prevent moire from being noticeable. Thus, it is possible to provide images desired by a user in each halftone mode.

Third Embodiment

Here, an explanation is given of a case where there are more variety of types of gradation processes for the process color. According to the present embodiment, FIG. 11 illustrates an example of the UI of the driver in a case where, for example, there are eight choices of halftone modes. The user selects one from the halftone modes 1 to 8. The type of gradation process that corresponds to each halftone mode is illustrated in FIG. 12, and the number of screen lines and the screen angle for the CMYK plate that corresponds to each type of gradation process are illustrated in FIG. 13.

In the example that is illustrated in FIG. 11, the halftone mode 3 is selected. If the halftone mode 3 is selected, it corresponds to 175 lpi-Dot as the type of gradation process, as illustrated in FIG. 12. Furthermore, the number of screen lines and the screen angle for the CMYK plate, which corresponds to the type of gradation process, 175 lpi-Dot, are illustrated in FIG. 13.

According to the present embodiment, the screen setting unit 125 stores the screen process, illustrated in FIG. 14, for the special toner screen. The second gradation-process determining unit 124 determines the optimum type of gradation process for the special toner on the basis of the information on the screen set of the CMYK plates that are determined by the first gradation-process determining unit 123.

Here, the second gradation-process determining unit 124 relates the types of gradation processes as in FIG. 15. Among the types of gradation processes for the special toner plate, the assigned one has the same dot growing type (Dot or Line) and almost the same number of screen lines. Thus, the gradation process is performed, which has almost the same degree of stability as the screen for the process color toner. Although the gradation process for the process color toner is performed corresponding to the halftone mode that is designated by the user, the appropriate type of gradation process is further assigned to the special toner plate, whereby it is possible to provide output materials that correspond to the image quality that is desired by the user.

That is, in the mode where the small number of lines is assigned to require the stability, the stable screen with the small number of lines is also applied to the special toner plate, whereby the occurrence of uneven glossiness due to instability is prevented so that images with even glossiness may be obtained.

Furthermore, if the user selects the FM screen, the halftone mode is set for the purpose of preventing the occurrence of interference; therefore, the FM screen, which basically prevents the occurrence of interference, is also related to the special toner.

Fourth Embodiment

In the above-described first to third embodiments, an explanation is given of a case where the clear toner is applied as the special toner plate; however, according to the present embodiment, an explanation is given of a case where white toner is used as the special toner plate. The basic system configuration is the same as that in the above-described first embodiment. In a case where the clear toner is changed into the white toner as the fifth toner, if the same screen is applied to both of them, moire sometimes occur due to the overlap between the white toner and the other colors.

According to the fourth embodiment, the second gradation-process determining unit 124 uses FIG. 16 instead of FIG. 15, described above, as the type of gradation process for the special toner that corresponds to each type of gradation process for the process color. That is, the type of gradation process for the special toner is changed from 175 lpi-Dot, in FIG. 15, into 175 lpi-Line.

With reference to FIG. 13 and FIG. 14, described above, all the screen angles of the Y plate of 175 lpi-Dot and 200 lpi-Dot and of the S plate of 175 lpi-Dot are 90 degrees. If the clear toner is superimposed on the process color, the clear toner screen is the same as the screen of the Y toner, whereby noticeable moire is less likely to occur. Usually, if the screen angle of a different plate is not separately set, moire easily occurs; however, the clear toner and the Y toner have less effect on the sense of vision compared to the other toners, and therefore it is considered that there is no problem if the same screen angle is set.

Meanwhile, the white toner has a larger effect on the sense of vision compared to the clear toner; therefore, if the same screen as that for the clear toner is applied, moire is sometimes noticeable. Therefore, in such a case, it is preferable to apply a gradation process with a different screen angle. The line screen is superimposed on the dot screen; however, it is confirmed that there is a case where, if the screen with a different dot growing method is deliberately superimposed, moire is less likely to occur.

Generally, the dot screen, where a dot grows in an exact circle in a centered manner, has higher dot reproducibility and superior stability compared to the line screen. If the dot screen or the line screen with almost the same number of lines may be selected, it is preferable to assign the dot screen as in FIG. 15 unless there is a major defect, such as moire, in the image quality. However, as in the present embodiment, if moire occurs due to the overlap between the dot screens, it is preferable to use the line screen that is of a different screen growth type.

Furthermore, in addition to the example that is described here, the system may be provided with two types of screens as the 175 lpi-Dot screen. A possible way is that one of them is assigned as a 175 lpi-Dot screen for the clear toner and the other one of them as a 175 lpi-Dot screen for the white toner.

In this way, if the clear toner is used as the special toner, the screen angle of the Y plate for the first gradation-process determining unit 123 is applied as the screen angle for the second gradation-process determining unit 124. Conversely, if the white toner is used as the special toner, the applied screen angle is different from those of all the plates for the first gradation-process determining unit 123. Thus, it is possible to prevent the occurrence of moire due to the assignment of the same screen to multiple special toners.

Furthermore, if the clear toner is used as the special toner, the second gradation-process determining unit 124 applies the screen angle of the Y plate for the first gradation-process determining unit 123. Conversely, if the white toner or the special color toner is used as the special toner, the second gradation-process determining unit 124 applies the screen angle that is different from those of all the plates for the first gradation-process determining unit 123. Thus, it is possible to prevent the occurrence of moire due to the assignment of the same screen to multiple special toners.

Furthermore, if there are screens that have the same number of lines and different growth processing methods as the candidates for the type of gradation process for the second gradation-process determining unit 124, a screen with a different gradation processing method from the first gradation-process determining unit 123 is applied as the type of gradation process for the second gradation-process determining unit 124. Thus, if there are multiple choices with the same number of lines as the screens to be applied to the special toner plate, it is possible to reduce uneven glossiness, moire, and roughness.

Fifth Embodiment

In the first to the fourth embodiments that are described above, an explanation is given of a case where the uniform screen is applied to all the objects. Here, an explanation is given of an example where the screen, which is applied to each object, is changed in accordance with the type of gradation process for the process color.

First, there are eight types of gradation processes for the process color in FIG. 17. Furthermore, as illustrated in FIG. 18, there are also eight types of gradation processes for the special toner.

A user selects a halftone mode via the driver to designate the type of screen process to be applied to the print material; however, contrary to the above embodiments, the number of types of halftone modes is not the same as the number of types of gradation processes for the process color. This is because there are combinations of screens to be assigned for each object, as illustrated in FIG. 20. FIG. 19 illustrates an example of the UI of the driver. The user selects one from the halftone modes 1 to 10.

FIG. 20 illustrates the screen that is applied to each object, such as image, graphics, text, for the process-color toner plate in each halftone mode. Furthermore, on the rightmost column, the corresponding type of gradation process for the special toner is described. The same screen is applied to all the objects for a gradation process for the special toner.

In a case where the clear toner is used as the special toner, if the screen is changed for each object, the glossiness is sometimes changed at the boundary of objects although the uniform glossiness needs to be applied. Therefore, the gradation process for the special toner is here common to all the objects, and a relatively stable screen with the small number of lines is used.

Therefore, the second gradation-process determining unit 124 assigns the screen with the smallest number of lines to the type of gradation process for the special toner among all the process-color gradation processes that are applied to the objects. Typically, the most stable screen is often used for images, and the screen with the large number of lines, which is superior in character/thin-line reproducibility, for texts. However, the gradation process for the special toner is assigned such that the optimum superimposition is obtained with regard to the image object for which the glossiness using the clear toner is regarded as most important. This holds the same for a case where not only clear toner but also other special toners, such as white toner, is used, and a gradation process for the special toner may be assigned such that the optimum superimposition is obtained with regard to an image object.

Furthermore, without determination by using the number of lines, the same screen as that for the image object may be assigned directly to the type of gradation process for the special toner.

Thus, further for the process-color plate, if multiple different types of gradation processes are determined by the first gradation-process determining unit 123 for respective print objects, the reference screen is determined from the types of gradation processes determined by the first gradation-process determining unit 123. Then, based on the reference screen, the type of gradation process of the second gradation-process determining unit 124 is determined. Thus, if the uniform effect (glossiness, or the like) needs to be applied by using the special toner, the effect (glossiness) is prevented from being changed at the boundary of objects. Furthermore, with regard to the object to which the stable screen is applied, for which the image quality is regarded as most important, images may be output at the optimum settings (the settings for obtaining the stable image quality) as the special toner.

Sixth Embodiment

Here, an explanation is given of another example where the applied screen is changed for the type of gradation process for the process color for each object.

In the same manner as in the fifth embodiment, there are eight types of gradation processes for the process color in FIG. 17. Contrary to the fifth embodiment, the system allows five types of gradation processes for the special toner as illustrated in FIG. 14. The second gradation-process determining unit 124 determines the optimum type of gradation process for the special toner as in FIG. 21 on the basis of the information on the screen set of the CMYK plates that are determined by the first gradation-process determining unit 123.

Here, the screen with the smallest number of lines is first set to the reference screen among all the gradation processes for the process colors that are applied to the objects. Among the types of gradation processes for the special toner plate, the assigned one has the same dot growing type (Dot or Line) and almost the same number of screen lines as the reference screen. Thus, the gradation process that has almost the same degree of stability as the screen for the process color toner is performed. With regard to the gradation process for the process color toner, the process that corresponds to the halftone mode, designated by the user, is performed; however, the appropriate type of gradation process is further assigned to the special toner plate, whereby it is possible to provide output materials that correspond to the image quality that is desired by the user.

That is, in the mode where the small number of lines is assigned to require the stability, the stable screen with the small number of lines is also applied to the special toner plate, whereby the occurrence of uneven glossiness due to instability is prevented so that images with uniform glossiness may be obtained. Furthermore, as described in the fifth embodiment, the gradation process for the special toner is assigned such that the optimum superimposition is obtained with regard to the screen (typically, image object) that most requires the stability.

Furthermore, if the user selects the FM screen, which represents the tonality depending on the size of dense print dots, the halftone mode is set for the purpose of preventing the occurrence of interference; therefore, the special toner is also related to the FM screen, which basically prevents the occurrence of interference.

Seventh Embodiment

An explanation is given of the system where a user may optionally designate the type of gradation process of each object in the above-described sixth embodiment. Furthermore, here, the type of gradation process that may be designated by a user is only the type of gradation process for the process color. The special toner plate is common to all the objects, and the type of gradation process for the special toner is determined in accordance with a result of designation of the type of gradation process for each object by the user.

In this system, the user selects a user definition mode as the halftone mode. The contents of the user definition include selection of the type of gradation process for each object, such as image, graphics, or text, via the driver from the ones in FIG. 17.

According to the present embodiment, in the same manner as the sixth embodiment, the system allows the five types of gradation processes for the special toner as illustrated in FIG. 14. At this point, the second gradation-process determining unit 124 determines the reference screen from the type of gradation process that is designated by the user. The most appropriate type of gradation process for the special toner is assigned with respect to the reference screen.

Here, the reference screen is determined at the following steps of 1 to 3.

1. If all the objects are the FM screen, the FM screen is set as the reference screen.

2. The object of the FM screen is removed, and the screen with the smallest number of lines is determined among all the objects. If one or two objects are the FM screen, it is considered except for the FM screen.

3. If there is the single screen with the smallest number of lines, it is set as the reference screen. If there are multiple ones (e.g., if there are both 200 lpi-Dot and 200 lpi-Line), the dot screen is set as the reference screen.

FIG. 22 illustrates three examples of the user definition. These are the screens that are designated by the user. Here, FIG. 23 is the result of determination of the reference screen in accordance with the above-described steps. With regard to the reference screen, if the appropriate type of gradation process for the special toner is determined as is the case with the above-described embodiment, the screen that is illustrated in the rightmost column of FIG. 23 is obtained.

The second gradation-process determining unit 124 determines that the screen with the smallest number of lines is the reference screen among multiple types of gradation processes determined by the first gradation-process determining unit 123 and selects the number of lines that is equal to or less than that of the reference screen. As the small number of lines is a type of stable gradation process, if the uniform effect (glossiness, or the like) due to the special toner needs to be applied, the effect (glossiness) is prevented from being changed at the boundary of objects. Furthermore, with regard to the object to which the stable screen is applied, for which the image quality is regarded as most important, images may be output with the optimum settings (the setting for obtaining the stable image quality) as the special toner.

As for determination of the reference screen, if there are multiple screens with the smallest number of lines, the dot screen is selected with priority. As the dot screen is a type of stable gradation process, if the uniform effect (glossiness, or the like) due to the special toner needs to be applied, the effect (glossiness) is prevented from being changed at the boundary of objects. Furthermore, with regard to the object to which the stable screen is applied, for which the image quality is regarded as most important, images may be output with the optimum settings (the setting for obtaining the stable image quality) as the special toner.

Here, the reason why the screen with the smallest number of lines is the reference screen is that the gradation process for the special toner is assigned so as to obtain the optimum superimposition with regard to the screen for which the stability is most required. The reason why priority is given to the dot screen over the line screen when the minimum number of lines is the same is that the dot screen is the most stable screen. However, if the FM screen is applied to all the objects, the reference screen needs to be also the FM screen. Here, the same holds for a case where a dot-distributed type screen, such as error diffusion, is applied instead of the FM screen.

Eighth Embodiment

Here, an explanation is given of a case where special color toner, such as green or orange, is used as the special toner in the engine 111 of FIG. 1.

The color-conversion processing unit 121 conducts color separation by using the color that includes the special color toner, such as green or orange, other than the process color toner, thereby achieving wider color gamut reproduction. In this case, the special color toner has a larger effect on the sense of vision compared to the clear toner, as described with regard to the white toner in the above-described fourth embodiment. Therefore, if the same screen as that for the clear toner is applied, moire becomes noticeable. Hence, in such a case, it is preferable to apply a gradation process with a different screen angle. Assignment of the applied screen is the same as that described according to the fourth embodiment.

If the special color toner, such as green or orange, is used as the special toner, the second gradation-process determining unit 124 determines, for each object, that the reference screen is the type of gradation process of that object for the first gradation-process determining unit 123. Thus, if color separation is conducted by using multiple colors of equal to or more than five colors, priority does not need to be given to prevention of changes in the screen at the boundary of objects with regard to the special color toner; therefore, optimization may be conducted on each object.

As described above, if the clear toner is used as the special toner, the screen angle of the Y plate of the first gradation-process determining unit 123 is applied as the screen angle of the second gradation-process determining unit 124. Conversely, if green, orange, or the like, is used as the special toner, the screen angle is applied, which is different from those of all the plates of the first gradation-process determining unit 123. Thus, it is possible to prevent moire that occurs due to assignment of the same screen to multiple special toners.

Ninth Embodiment

An explanation is given of further another application method in a case where the special color toner, such as green or orange, is used as the special toner in FIG. 1. In the same manner as the sixth embodiment, there are eight types of gradation processes for the process color in FIG. 17. Furthermore, the system allows five types of gradation processes for the special toner, as illustrated in FIG. 14.

As in the present embodiment, if color separation is conducted by using multiple colors of equal to or more than five colors, high color reproduction using a wide color gamut is often required with the special toner rather than simply applying the uniform effect to the entire document. In such a case, priority does not need to be given to prevention of changes in the screen at the boundary between objects with regard to the special color toner.

Therefore, optimization is conducted on each object with regard to the type of gradation process for the special toner. In this case, optimization is conducted on each object, and the same relation as that illustrated in FIG. 15 is obtained according to the present embodiment. The second gradation-process determining unit 124 assigns the special-toner gradation process of each object by using, as the reference screen, the screen of the object that corresponds to the type of gradation process for the process color. FIG. 24 illustrates the above result with regard to the type of gradation process for the process color and the type of gradation process for the special toner for each of the image, graphics, and text.

Furthermore, the program that is executed by the information processing device according to the present embodiment is provided such that it is previously installed in a ROM, or the like. The above-described program may be provided by being stored, in the form of a file that is installable and executable, in a recording medium readable by a computer, such as a CD-ROM, a flexible disk (FD), a CD-R, or a digital versatile disk (DVD).

Furthermore, a configuration may be such that the program that is executed by the information processing device according to the present embodiment is stored in a computer connected via a network such as the Internet and is provided by being downloaded via the network. Moreover, a configuration may be such that the program that is executed by the information processing device according to the present embodiment is provided or distributed via a network such as the Internet.

The program that is executed by the information processing device according to the present embodiment has a modular configuration that includes the above-described units. In terms of the actual hardware, the CPU (processor) reads the program from the above-described ROM and executes it so as to load the above-described units into a main storage device so that each of the units is generated in the main storage device.

An embodiment provides an advantage that it is possible to obtain image outputs in accordance with the intended purpose of the halftone mode when the process-color toner plate is superimposed on the special toner plate.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing device comprising:
   a first gradation-process determining unit that determines a type of gradation process for a process-color toner plate in accordance with halftone mode information;
   a second gradation-process determining unit that determines a type of gradation process for a special toner plate in accordance with the type of gradation process determined by the first gradation-process determining unit for process colors; and
   a halftone processing unit that performs halftone processes in accordance with the types of gradation processes that are determined by the first gradation-process determining unit and the second gradation-process determining unit.

2. The image processing device according to claim 1, wherein number of screen lines of the special toner plate for the second gradation-process determining unit is set to the same value as number of screen lines for the first gradation-process determining unit.

3. The image processing device according to claim 1, wherein, when the number of screen lines for the first gradation-process determining unit is lower than a predetermined value, the second gradation-process determining unit assigns, from among a plurality of available screens, a screen having a smallest number of lines and, otherwise, assigns a dot-distributed type screen.

4. The image processing device according to claim 1, wherein the second gradation-process determining unit determines a type of gradation process in accordance with a type of special toner.

5. The image processing device according to claim 4, wherein, when clear toner is used as special toner, the second gradation-process determining unit uses a screen angle of a Y plate for the first gradation-process determining unit and, when white toner or special color toner is used as special toner, uses a screen angle that is different from every plate for the first gradation-process determining unit.

6. The image processing device according to claim 1, wherein, when there is screens that have the same number of lines and different growth processing methods as candidates for a gradation processing method, the second gradation-process determining unit uses a screen with a different type of gradation process from the first gradation-process determining unit.

7. The image processing device according to claim 1, wherein, when the first gradation-process determining unit determines multiple different types of gradation processes for respective print objects of a process-color plate, the second gradation-process determining unit determines the type of gradation process based on a reference screen that is determined from the multiple types of gradation processes determined by the first gradation-process determining unit.

8. The image processing device according to claim 7, wherein the second gradation-process determining unit determines that a screen with a smallest number of lines is the reference screen among the multiple types of gradation processes determined by the first gradation-process determining unit and determines number of lines that is equal to or less than the reference screen.

9. The image processing device according to claim 8, wherein, when there are multiple screens with a smallest number of lines, the reference screen is determined such that a dot screen is determined with priority.

10. The image processing device according to claim 7, wherein, when special color toner of green or orange is used as special toner, the second gradation-process determining unit determines, for each object, that the reference screen is a type of gradation process for that object for the first gradation-process determining unit.

11. An image forming system comprising:
    the image processing device according to claim 1; and
    an image forming apparatus that forms an image of the process-color toner plate and the special toner plate other than the process color.

12. An image processing method comprising:
    first determining a type of gradation process for a process-color toner plate in accordance with halftone mode information;
    second determining a type of gradation process for a special toner plate in accordance with the type of gradation process determined at the first determining for process colors; and
    performing a halftone process in accordance with the types of gradation processes that are determined at the first determining and the second determining.

13. A computer program product comprising a non-transitory computer-readable medium containing an information processing program, the program codes causing a computer to perform:

first determining a type of gradation process for a process-color toner plate in accordance with halftone mode information;
second determining a type of gradation process for a special toner plate in accordance with the type of gradation process determined at the first determining for process colors; and
performing a halftone process in accordance with the types of gradation processes that are determined at the first determining and the second determining.

* * * * *